(12) United States Patent
Mianzo et al.

(10) Patent No.: US 6,554,091 B2
(45) Date of Patent: Apr. 29, 2003

(54) ENGINE OUTPUT CONTROLLER (75) Inventors: Lawrence A. Mianzo, Plymouth, MI (US); Stephen De La Salle, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/034,685

(22) Filed: Dec. 28, 2001

(65) Prior Publication Data

US 2002/0056581 A1 May 16, 2002

Related U.S. Application Data (63) Continuation-in-part of application No. 09/657,877, filed on Sep. 8, 2000, now Pat. No. 6,347,680.

(51) Int. Cl.[7] .............................................. B60K 13/02
(52) U.S. Cl. .................... 180/197; 180/170; 701/93; 123/350
(58) Field of Search .................... 180/197, 170, 180/175–179; 701/53–56, 58, 60, 64, 66; 123/345, 346, 349, 394, 403, 350

(56) References Cited

U.S. PATENT DOCUMENTS

| | | |
|---|---|---|
| 4,651,684 A | 3/1987 | Masuda et al. |
| 4,714,864 A | 12/1987 | Yogo et al. |
| 4,984,167 A | 1/1991 | Amano et al. |
| 5,022,357 A | 6/1991 | Kawamura |
| 5,078,109 A | 1/1992 | Yoshida et al. |
| 5,088,043 A | 2/1992 | Akishino et al. |
| 5,197,008 A | 3/1993 | Itoh et al. |
| 5,243,526 A | 9/1993 | Ito et al. |
| 5,284,116 A | 2/1994 | Richeson, Jr. |
| 5,297,048 A | 3/1994 | Gauer |
| 5,400,865 A | 3/1995 | Togai et al. |
| 5,541,843 A | 7/1996 | Yamaguchi et al. |
| 5,588,411 A | 12/1996 | Kreuter et al. |
| 5,615,655 A * | 4/1997 | Shimizu ..................... 123/419 |
| 5,623,412 A | 4/1997 | Masson et al. |
| 5,625,558 A | 4/1997 | Togai et al. |
| 5,668,727 A | 9/1997 | Pellerito et al. |
| 5,996,560 A | 12/1999 | Schechter |
| 6,155,217 A | 12/2000 | Shiraishi et al. |
| 6,199,006 B1 * | 3/2001 | Weiss et al. ................ 701/102 |
| 6,278,933 B1 | 8/2001 | Buckland et al. |
| 6,286,482 B1 | 9/2001 | Flynn et al. |
| 6,304,809 B1 | 10/2001 | Cullen et al. |
| 6,330,873 B1 * | 12/2001 | Letang et al. ............... 123/322 |
| 6,379,281 B1 * | 4/2002 | Collins et al. .............. 477/107 |

* cited by examiner

*Primary Examiner*—Lesley D. Morris
*Assistant Examiner*—Tony Winner
(74) *Attorney, Agent, or Firm*—John E. Kajander (57) ABSTRACT

An engine output control method for a vehicle having a throttleless internal combustion engine system responsive to a desired engine speed signal. The method includes generating a driver demanded engine speed value corresponding to an operator input and generating a speed control system engine speed value corresponding to a predetermined speed value to permit vehicle operation at a constant speed by a speed control system. The method arbitrates between the driver demanded engine speed value and the speed control system engine speed value to derive a first desired engine speed value. This value is limited by a vehicle speed limit value, engine speed limit value, and transmission speed limit value to generate a second desired engine speed value. The engine is then controlled as a function of the second desired engine speed value and an actual engine speed value. Engine control is accomplished by way of variable valve timing, fueling rate and/or fuel flow, and spark advance.

16 Claims, 5 Drawing Sheets

ENGINE OUTPUT CONTROLLER

CROSS REFERENCE TO RELATED APPLICATIONS

This application is a Continuation-In-Part of U.S. application Ser. No. 09/657,877 filed on Sep. 8, 2000 now U.S. Pat. No. 6,347,680 entitled "Engine Output Controller."

BACKGROUND OF THE INVENTION

The invention relates generally to control systems for internal combustion engines, and more particularly, concerns a powertrain controller for a throttleless engine.

Conventional internal combustion engines generally fall into two categories: spark ignited (SI) engines and compression ignition (CI) engines. In general, an SI engine's power is controlled through a process called throttling. Throttling controls the density of air that enters an engine's combustion chambers. The throttle system is typically comprised of one or more throttle blades which are within the intake air stream. During engine idle or a closed throttle condition, the throttle blade closes off the air inlet creating a large pressure drop and density decrease. When the throttle is wide open, the throttle blade is generally parallel to the air stream and presents a minimal air restriction to inducted airflow. Under most engine operating conditions, the throttle blade is somewhere between fully open and fully closed thus presenting a controlled restriction of the intake airflow.

Fuel in an SI engine is generally introduced into the inlet air stream to provide a combustible air fuel mixture. Fuel injectors are often located in a common plenum feeding all of the cylinders on a multi-cylinder engine. When injected at this location, the engine is said to be throttle-body injected. Injectors can alternatively be located in the intake runners feeding the individual cylinder intake ports. This type of injection is referred to as port injection. Alternatively, fuel injectors can be located directly within each cylinder. This type of injection is referred to as a direct injection engine.

Power output of an internal combustion engine can also be controlled entirely by the amount of fuel introduced into the combustion chamber just prior to ignition. In CI engines such as diesel engines, the engine typically does not have a throttle. Air entering the engine is restricted only by the intake manifold design. Fuel is injected directly into the cylinder of the CI engine just prior to ignition, and ignition is caused by the high temperature generated during the piston compression stroke.

Also, alternative fuel systems have become an ever-greater concern in the search to conserve energy. Alternative energy power plants under consideration must provide the required power necessary to operate the vehicle, and at the same time be energy efficient, reduce emissions, and be cost effective. One such alternative energy power plant under consideration is a hydrogen-fueled internal combustion engine. Natural gas has also long been a potential gaseous alternate fuel for internal combustion engines.

For throttleless engine-equipped vehicles such as a variable valve timing-equipped vehicle, it is also necessary to interpret driver demand and convert it to an appropriate engine control command to deliver the desired engine/vehicle response. Prior engine control arbitration schemes typically use throttle angle as a common control variable to control airflow and, hence, engine output. See, for example, U.S. Pat. No. 5,400,865.

Interpreting driver demand and generating an appropriate engine command, however, is complicated by the existence of other sub-systems including vehicle, engine or transmission constraints such as vehicle speed limits, engine speed limits and transmission speed or torque limits. Further, in an throttleless engine, engine output must be controlled by a mechanism other than the throttle plate. Accordingly, there is a need for an arbitration scheme which selects the most appropriate engine control parameter from the various requesters. Arbitration schemes that rely upon a common control variable such as airflow by way of a throttle position may not be suitable for some vehicle and engine systems. Accordingly, there is a need for an improved engine output controller for use in throttleless engines.

SUMMARY OF THE INVENTION

The present invention provides an engine output control method and system for a vehicle having a throttleless engine system responsive to a desired engine speed signal. An engine output control method for a vehicle having a throttleless internal combustion engine system responsive to a desired engine speed signal. The method includes generating a driver demanded engine speed value corresponding to an operator input and generating a speed control system engine speed value corresponding to a predetermined speed value to permit vehicle operation at a constant speed by a speed control system. The method arbitrates between the driver demanded engine speed value and the speed control system engine speed value to derive a first desired engine speed value. This value is limited by a vehicle speed limit value, engine speed limit value, and transmission speed limit value to generate a second desired engine speed value. The engine is then controlled as a function of the second desired engine speed value and an actual engine speed value. Control of the engine output is accomplished by way of variable valve timing, fueling rate and/or fuel flow, and spark advance. In another aspect of the invention, a traction control value and transmission limiting value are generated in the torque domain and arbitrated against the speed domain-based second desired engine speed value to control the engine output.

In another embodiment of the present invention, values are generated in the acceleration domain to control the engine output. Specifically, values are generated for a driver demanded vehicle acceleration value corresponding to an accelerator pedal position; a speed control system vehicle acceleration value corresponding to a predetermined speed value to permit vehicle operation at a constant speed by a speed control system; a vehicle speed limit acceleration value corresponding to a maximum vehicle acceleration value to achieve a predetermined vehicle speed limit; and a traction control vehicle acceleration value corresponding to a maximum vehicle acceleration value to prevent wheel slip. These values are then arbitrated to derive a first desired vehicle acceleration value. The first desired vehicle acceleration value is limited by an engine speed limit value and transmission speed limit value to generate a second desired vehicle acceleration value. The resulting value can be used to control the engine output directly or converted to a desired engine acceleration value to control the engine output. Again, engine output is controlled by way of variable valve timing, fueling rate and/or fuel flow, and spark advance.

Other advantages of the invention will become apparent upon reading the following detailed description and appended claims and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of example to the invention.

In the drawings.

DETAILED DESCRIPTION OF THE PREFERRED EMBODIMENT

Figure 1:
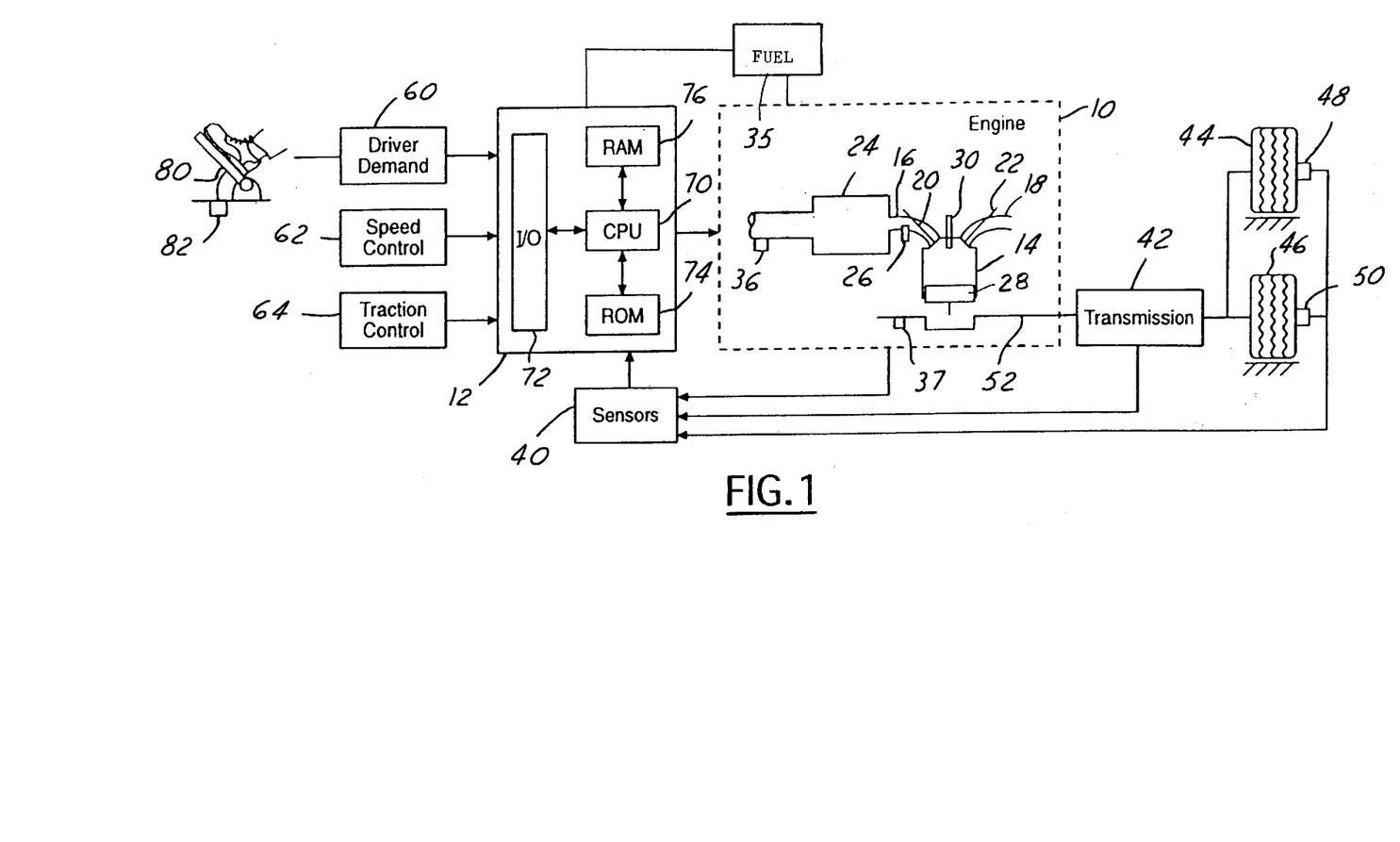
FIG. 1 is a schematic diagram of an internal combustion engine and associated control system according to one embodiment of the present invention.

Turning first to FIG. 1, there is shown a schematic diagram of an internal combustion engine 10 and associated engine controller 12 in accordance with one embodiment of the present invention. The engine 10 includes a plurality of combustion chambers 14, one of which is shown. Each combustion chamber 14 has an associated intake 16 and exhaust 18 operated by a respective valves 20, 22. Valves 20, 22 allow variable valve timing and are controlled electronically using electromagnetic actuators rather than a conventional cam arrangement. Combustion occurs as a result of the intake of air and fuel from the intake manifold 24 and fuel injector 26 respectively, compression by the piston 28 and ignition by the spark plug 30. Engine 10 may also operate in a compression ignition mode wherein combustion occurs as a result of the intake of air and fuel and compression by the piston 28 without ignition by the spark plug 30. Combustion gases travel through the exhaust manifold 18 to the downstream catalytic converter (not shown) and are emitted out of the tailpipe. A portion of the exhaust gases may also be recirculated back through the intake manifold 24 to the engine cylinders 14 by way of an EGR valve (not shown).

The engine 10 is preferably a gaseous-fueled engine wherein gaseous fuel such as hydrogen is supplied to the engine 10 from a fuel supply 35 by way of the fuel injector 26. It should be understood that although one injector 26 is illustrated per cylinder 14, two or more injectors could be provided for each cylinder or for each intake port of the engine 10. Also, the injector 26 may be located adjacent the spark plug 30 for direct injection of fuel into the cylinder. Direct injection may also be preferable in the case of liquid fuels such as in a direct-injected diesel engine.

The engine 10 is a throttleless engine, thus, the airflow through the intake manifold 24 is controlled by valve timing. A mass airflow (MAF) sensor 36 measures the amount of air flowing into the engine 10. An engine speed sensor 37 provides a value indicative of the rotational speed of the engine 10. Further, additional sensors are represented by block 40 which provide feedback to the engine controller 12 relating to the status of the engine 10 transmission 42 and wheels 44, 46. Controller 12 receives various signals such as a first measurement of vehicle speed of wheel 44 from sensor 48, a second measurement of vehicle speed of wheel 46 from sensor 50, measurement of vehicle acceleration from an accelerometer (not shown) as well as various other signals from sensors such as engine coolant temperature (ECT), barometric pressure (BP), air charge temperature (ACT), and manifold pressure (MAP).

In the throttleless engine 10, output in the form of torque, speed or acceleration is controlled by airflow via valves 20, 22, fuel via injector 26, and spark timing via spark plug 30.

Transmission 42 is coupled to the crankshaft 52 of engine 10 and a first set of drive wheels 46. In addition, to provide all wheel drive, transmission 42 can also be coupled to a second set of drive wheels 44. Transmission 42 can be a combined gear set and torque converter, a manual transmission, automatic transmission, a continuously variable transmission, or any other power transfer unit known to those skilled in the art and suggested by this disclosure.

Continuing with FIG. 1, in addition to receiving various signals from sensors, controller 12 also receives inputs from the driver demand system 60, speed control system 62 and the traction control system 64. Controller 12 is a conventional microcomputer including a microprocessor unit 70 in communication with various computer readable storage media. The computer readable storage media preferably includes read-only memory (ROM) 74, random access memory (RAM) 76, and keep-alive memory. The computer readable storage media may be implemented using any of a number of known memory devices such as PROMs, EPROMs, EEPROMs, flash memory, or any other electric, magnetic, optical, or combination-memory device capable of storing data, some of which represents executable instructions, used by microprocessor 70 in controlling the engine. Microprocessor 70 communicates with the various sensors and actuators via an input/output (I/O) interface 72.

The driver demand system 60 interprets the operator's requested engine output by monitoring the position of the accelerator 80 by pedal position sensor 82. The pedal position value as measured by the sensor 82 is communicated to the controller 12 wherein a desired engine output is determined by known methods. The driver demand could also be determined from operator inputs other than the accelerator pedal such as push button. The speed control system 62 communicates a desired speed set by the vehicle operator to the controller 12 to maintain the vehicle speed at that desired by the operator. Traction control system 64 monitors wheel slip and/or vehicle acceleration to limit the engine output power accordingly.

Figure 2:
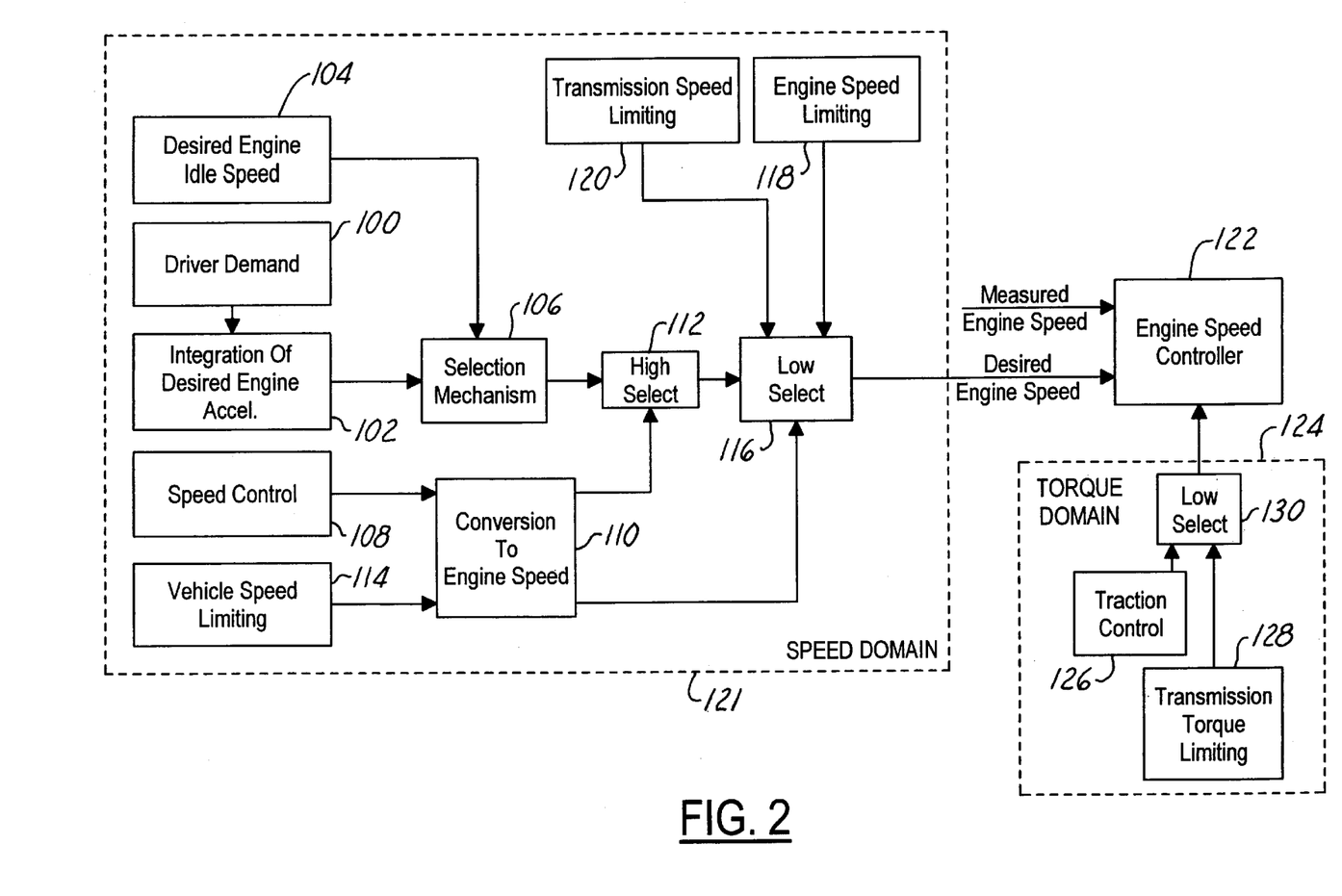
FIG. 2 is a block diagram of one embodiment of the controller of FIG. 1.

FIG. 2 shows a block diagram of one embodiment of the controller 12 of FIG. 1. FIG. 2 shows a manual transmission application wherein arbitration takes place between at least two different control variables. Specifically, driver demand and speed control are arbitrated in the engine speed domain, and the resulting desired engine speed is then arbitrated with traction control requirements in either the torque, acceleration, or speed domain.

Referring to FIG. 2, in block 100, the driver demanded engine acceleration is determined by known methods such as the pedal position input. The conversion from driver demand to engine acceleration will typically be a function of engine speed and inferred or measured driveline ratio in addition to the pedal position. In block 102, the desired engine acceleration is integrated with respect to time to generate a desired engine speed value. A desired engine idle speed is also determined in block 104 which represents a minimum engine speed for the engine operating conditions. By way of the selection mechanism 106, a new target engine speed is determined based on the idle speed request from block 104 and the driver demand from block 100. Typically, selection mechanism 106 will select the maximum engine speed as between the desired idle speed and the driver demand. Preferably, the selection mechanism is formed such that no "dead pedal" feel exists and any driver demand from an idle condition results in an increase in scheduled engine speed and resulting change in actual engine speed.

If active, a desired vehicle speed from the speed control system 108 will also be generated. A desired vehicle speed is translated into a desired engine speed in block 110 by way of the measured or inferred transmission gear ratio. The resulting engine speed is then arbitrated with the engine speed in the selection arbitration block 112 with the engine speed resulting from the selection mechanism 106. Preferably, the greater of the engine speed requests from the driver demand and speed control system will be selected in block 112.

The resulting engine speed value from arbitration block 112 is then constrained by vehicle engine and transmission speed limits. Vehicle speed limiting is determined in block 114 and is again converted to an engine speed limit associated therewith in block 110. This value is then passed along to the arbitration block 116. Similarly, an engine speed limit value from block 118 is also used to constrain the desired engine speed value resulting from the driver demand or speed control systems. Optionally, the system may also include integrated transmission speed protection in block 120, in which case, the transmission speed limit is applied as a clip to the engine speed limit request 118.

The desired engine speed as derived from the speed domain 121 is then communicated to the engine speed controller 122. Engine speed controller 122 can be PID controller which receives as an input a measured engine speed and outputs a desired airflow, fueling rate, valve timing and spark timing in the case of a gasoline engine to achieve the desired engine speed. In the case of gaseous-fueled engine, fuel flow and timing can also be controlled to modify the engine output. The controller 122 also accommodates other system constraints as received from the torque domain 124. The controller 122 determines the valve timing, fuel and spark control target values which result in the desired engine output speed. These values are generated by known methods during engine mapping and calibration for the particular engine configuration under consideration. For example, given the desired engine output torque or speed and measured engine speed (RPM) the desired spark advance (SA) can be determined. The corresponding valve timing command is determined as a function of the relative fuel-air ratio (AFR), the manifold absolute pressure (MAP), and intake mass airflow (MAF). Similarly, a fuel command is generated to achieve the desired engine output torque or speed as a function of the fuel rail temperature and pressure. The determined valve, fuel and spark control target values are arbitrated to optimize the engine operation for the current running conditions. Thus, for example, under low load conditions, the desired engine output speed or torque may be realized by operating the engine as a CI engine with throttleless airflow whereby the engine torque is regulated with only the fuel command and spark angle. In such a case, the wide flammability range of hydrogen fuel can be more fully utilized allowing the engine to run extremely lean during low torque demand situations. The throttleless airflow compression in a CI engine operation has the advantages of improved fuel economy, minimized engine output emissions and minimized engine pumping losses.

Torque domain restraints on the engine speed include a maximum torque value to prevent wheel slip as determined by the traction control system 126, and any torque-based transmission requirements in control block 128. These torque-based constraints are then clipped in block 130 and communicated to the engine speed controller 122. The engine speed controller 122, in turn, limits the engine output according to the torque-based constraints. Alternatively, the traction control system and transmission limiting can be derived in terms of an engine speed or engine acceleration and the resulting constraint arbitrated against the desired engine speed to control the engine accordingly.

Figure 3:
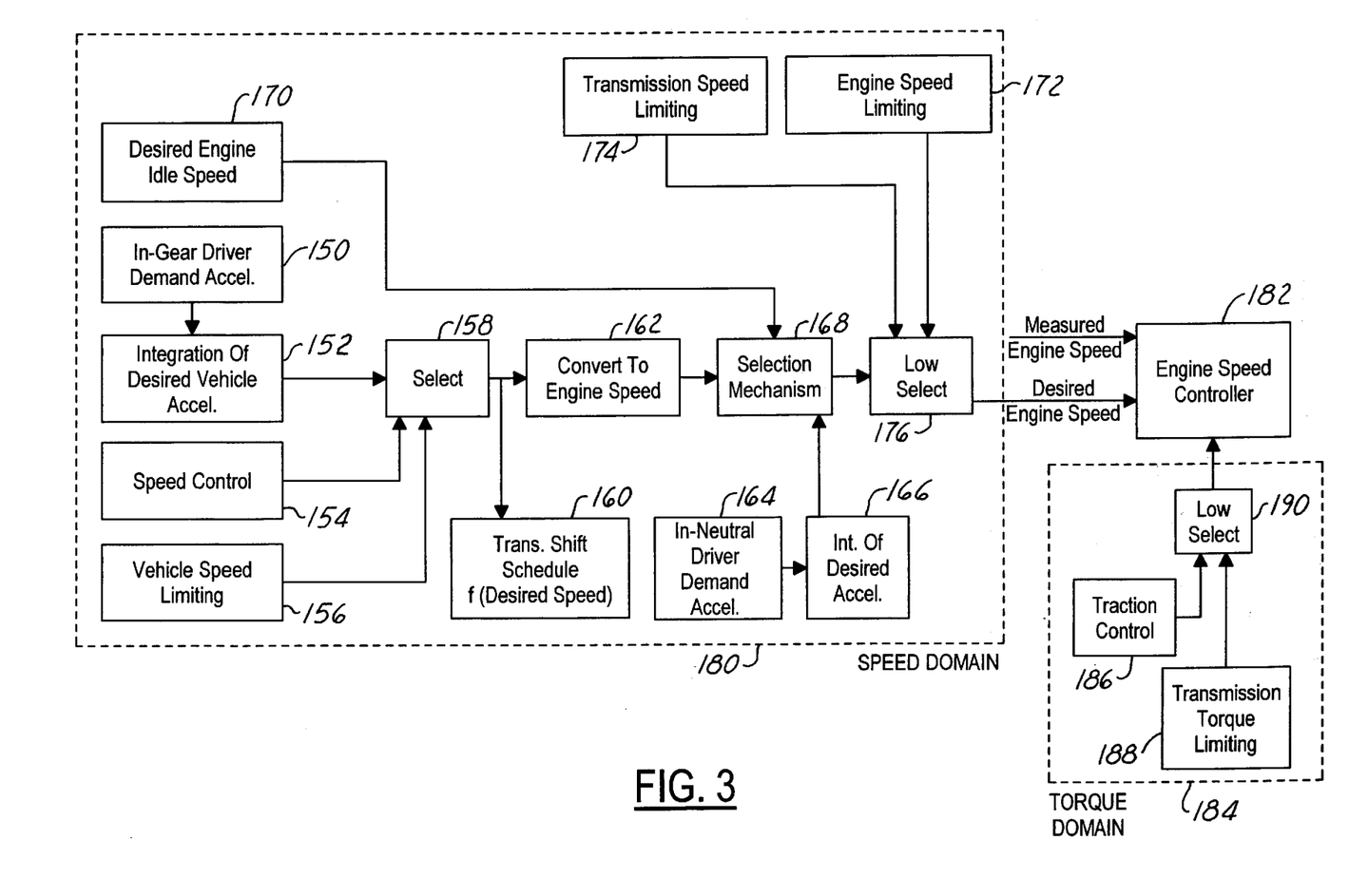
FIG. 3 is a block diagram of another embodiment of the controller of FIG. 1.

FIG. 3 shows a block diagram of another embodiment of the controller 12 of FIG. 1. FIG. 3 shows an automatic transmission application wherein arbitration takes place between at least two different control variables. Specifically, driver demand and speed control are arbitrated in the engine speed domain, and the resulting desired engine speed is then arbitrated with traction control requirements in either the torque, acceleration, or speed domain.

Referring to FIG. 3, in block 150, the driver demanded vehicle acceleration is determined by known methods such as a pedal position input. This is applicable when the transmission is engaged in gear. The conversion from driver demand to vehicle acceleration will typically be a function of vehicle speed and inferred or measured driveline ratio in addition to the accelerator pedal position. In block 152, the desired vehicle acceleration is integrated with respect to time to generate a desired road speed value. If active, a desired vehicle speed from the speed control system 154 will also be generated. Preferably, the system also includes vehicle speed limiting in block 156 which acts as a clip to ensure that the requested vehicle speed does not exceed a maximum allowable value. These values are arbitrated in block 158 and a selection is made of the most appropriate value of desired road speed from among the in-gear driver demand, speed control system, and speed limiting system.

For transmission shift scheduling purposes, the desired road speed or acceleration can be used as a measure of driver demand as shown in block 160.

The desired vehicle speed is then converted in block 162 to an equivalent engine speed based on the measured or inferred transmission ratio. A corresponding in-neutral driver demand engine speed acceleration is determined in block 164 and is translated in block 166 to an equivalent in neutral engine speed demand. The selection mechanism 168 selects a new value of target engine speed based upon the idle engine speed request from block 170, the converted vehicle speed request from block 162, and the in-neutral driver request from block 166. Preferably, the selection mechanism 168 is formed such that no "dead pedal" feel exists in any driver demand from an idle condition results in an increase in scheduled engine speed and resulting change in actual engine speed.

The resulting engine speed value from arbitration block 168 is then constrained by an engine speed limit value from block 172. Optionally, the system may also include integrated transmission speed protection in block 174, in which case, the transmission speed limit value is also applied as a clip to the engine speed limit request 172. Arbitration block 176 acts to constrain the desired engine speed value from the driver demand and speed control systems by the engine speed limit and transmission speed limit values.

The desired engine speed as derived from the speed domain 180 is then communicated to the engine speed controller 182. Engine speed controller 182 can be PID controller which receives as an input in measured engine speed and outputs a desired valve timing, fueling rate, and spark timing in the case of a gasoline engine to achieve the desired engine speed. Fuel flow in the case of a gaseous-fueled engine may also be controlled to modify the engine output. The controller 122 determines the valve timing, fuel and spark control target values which result in the desired engine output speed. These values are generated by known methods during engine mapping and calibration for the particular engine configuration under consideration. The controller 182 also accommodates other system constraints as received from the torque domain 184.

Torque domain restraints on the engine speed include a maximum torque value to prevent wheel slip as determined by the traction control system 186, and any torque-based transmission requirements in control block 188. These torque-based constraints are then clipped in block 190 and communicated to the engine speed controller 182. The engine speed controller 182, in turn, limits the engine output according to the torque-based constraints. Alternatively, the traction control system and transmission limiting can be derived in terms of an engine speed or engine acceleration, and the resulting constraint arbitrated against the desired engine speed to control the engine accordingly.

Figure 4:
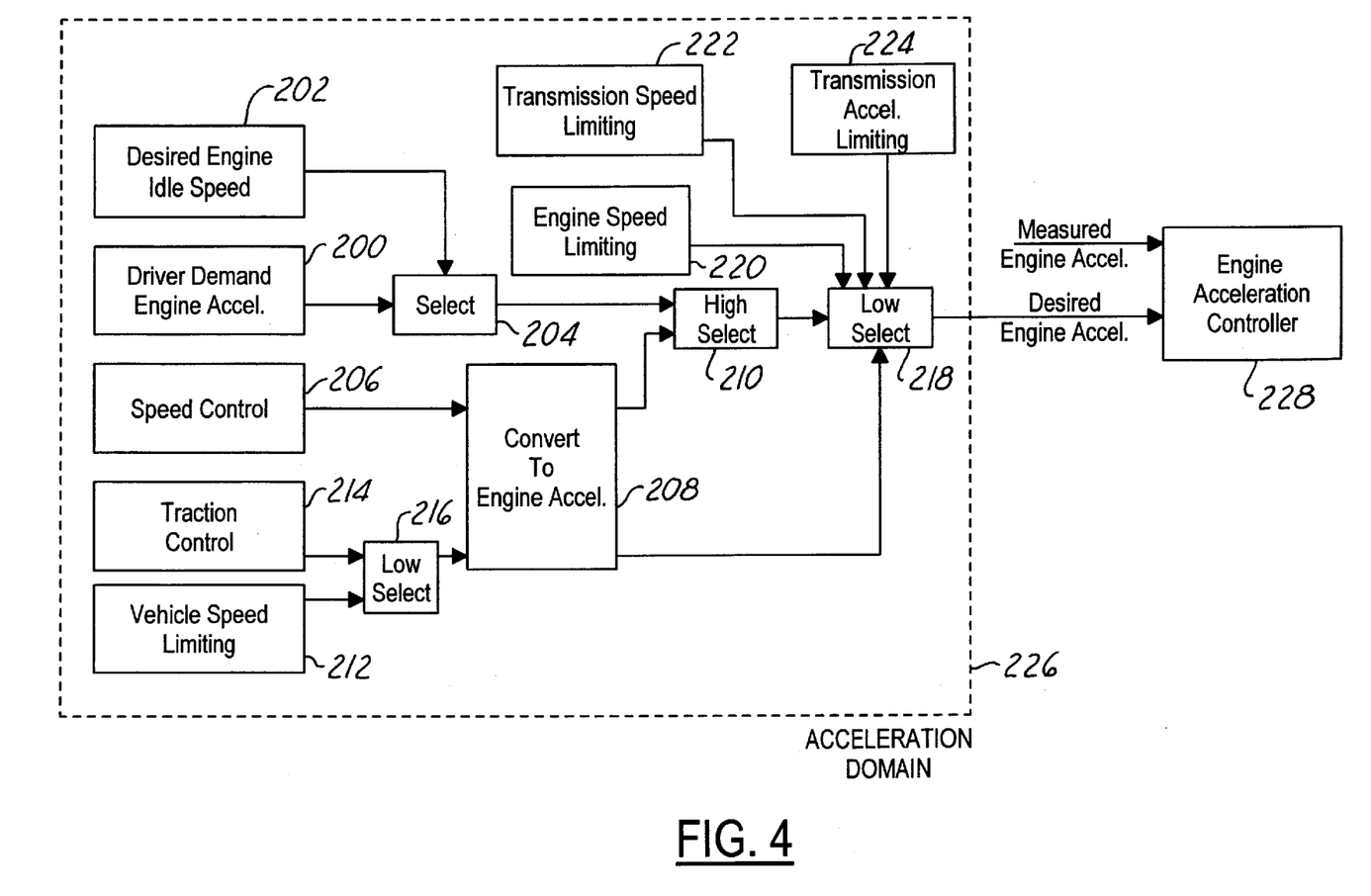
FIG. 4 is a block diagram of another embodiment of the controller of FIG. 1.

FIG. 4 shows a block diagram of another embodiment of the controller 12 of FIG. 1. FIG. 4 shows a manual transmission application wherein arbitration takes place between the driver demand, speed control, and traction control systems in the engine acceleration domain. In block 200, the driver demanded engine speed acceleration is determined by, for example, the pedal position input. The conversion from pedal position input to desired engine speed acceleration will typically be a function of engine speed and inferred or measured driveline ratio in addition to the pedal position input. A desired engine acceleration request to maintain the engine idle at its predetermined value is also determined in block 202. By way of the selection mechanism 204, a new target engine speed acceleration is determined based upon the idle engine speed acceleration request from block 202 and the driver demanded engine speed acceleration request from block 200. Typically, the selection mechanism 204 will select the maximum engine speed acceleration as between the idle speed request and driver demand. Preferably, the selection mechanism 204 is formed such that no "dead pedal" feel exists and any driver demand from an idle condition results in an increase in scheduled engine speed acceleration and resulting change in actual engine speed.

If active, a desired vehicle speed acceleration from the speed control system 206 will also be generated. The desired vehicle speed acceleration is translated to a desired engine speed acceleration in block 208 by way of the measured or inferred transmission gear ratio. The resulting desired engine acceleration is then arbitrated in block 210 with the engine acceleration request from selection block 204.

This system also includes vehicle speed limiting in block 212 and traction control system 214 both of which generate vehicle speed acceleration limits, the lowest one of which is selected in block 216. The resulting value is again converted from a vehicle acceleration value to an engine acceleration value in block 208 and communicated to arbitration block 218.

Preferably, the system also includes engine acceleration speed limiting 220, and integrated transmission speed protection 222 as well as acceleration-based transmission torque truncation 224. All of these values which act to limit the engine acceleration are also communicated to the arbitration block 218, wherein the received values are arbitrated with the driver demand and speed control resulting engine acceleration value to produce a final desired engine acceleration value.

The desired engine acceleration value as derived from the acceleration domain 226 is then communicated to the engine acceleration controller 228. The engine acceleration controller 228 is preferably a PID controller which receives as an input a measured engine acceleration value and outputs a desired airflow, fueling rate, and spark timing in the case of a gasoline engine to achieve the desired acceleration value.

Figure 5:
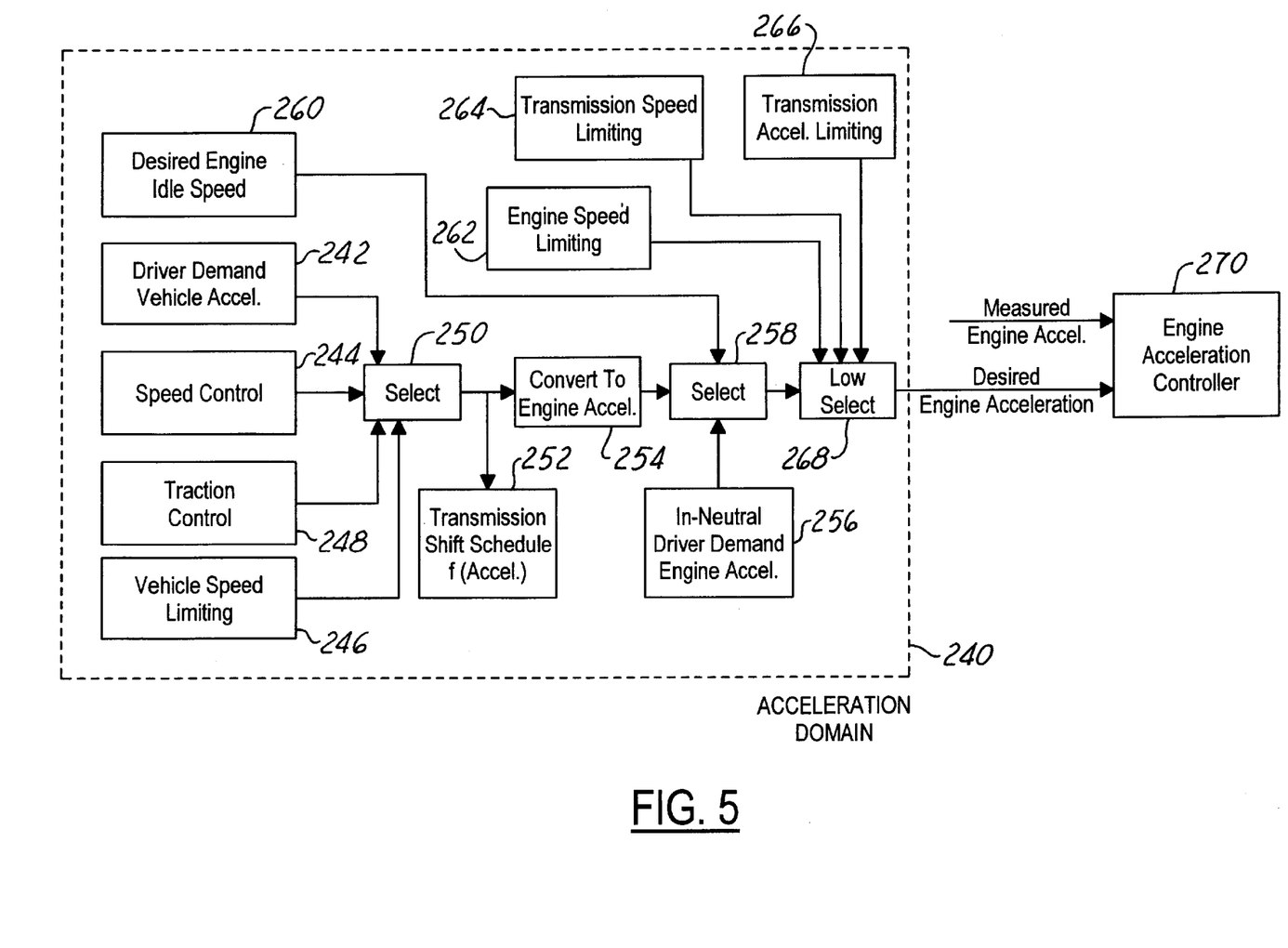
FIG. 5 is a block diagram of another embodiment of the controller of FIG. 1.

FIG. 5 shows a block diagram of another embodiment of the controller 12 of FIG. 1. FIG. 5 shows an automatic transmission application wherein arbitration takes place in the acceleration domain 240. In block 242, the driver demanded vehicle acceleration is determined when the transmission is engaged. The conversion from the driver demand to a desired vehicle acceleration will typically be a function of vehicle speed and the inferred or measured driveline ratio in addition to the accelerator pedal position. If active, a desired vehicle speed acceleration from the speed control system 244 will also be generated. Preferably, this system also includes vehicle speed limiting 246 and traction control system 248 which each generate vehicle acceleration limit values. The resulting vehicle acceleration values are arbitrated in block 250. For transmission shift scheduling purposes, the desired vehicle acceleration from arbitration block 250 can be used as a measure of driver demand in block 252.

The desired vehicle acceleration value from arbitration block 250 is then converted to an equivalent engine acceleration value in block 254 based on the measured or inferred transmission ratio. If the transmission is not in gear, an in-neutral driver demand engine acceleration request is determined in block 256. By way of the selection mechanism 258, a new value of target engine acceleration is determined based upon the idle engine acceleration request 260, the converted vehicle acceleration request 254, and the in-neutral driver demand 256. Preferably, the selection mechanism 258 is formed such that no "dead pedal" feel exists and any driver demand from an idle condition results in an increase in scheduled engine speed acceleration and a resulting change in actual engine speed.

As in the manual transmission application of FIG. 4, the system of FIG. 5 also includes engine speed limiting 262, transmission speed limiting 264, and acceleration-based transmission torque truncation 266. These clips are then applied in arbitration block 268 so as to ensure that the requested engine acceleration does not exceed any maximum allowable values. The resulting desired engine acceleration is communicated to the engine acceleration controller 270. Engine acceleration controller 270 can be PID controller which receives as an input a measured engine acceleration and outputs a desired valve timing, fueling rate, and spark timing in the case of a gasoline engine to achieve the desired engine acceleration. Fuel flow and timing in the case of a gaseous-fueled engine can also be controlled to modify the engine output. The final desired engine acceleration value can also be integrated to be put in the speed domain and a controller 270 can use feedback on the measured engine speed to achieve the desired engine speed.

From the foregoing, it can be seen that there has been brought to the art a new and improved engine control system for an throttleless engine-equipped vehicle. While the invention has been described with reference to one or more embodiments, it should be understood that it is not limited to these embodiments. On the contrary, the invention covers all alternatives, modifications, and equivalents as may be included with the spirit and scope of the appended claims.

What is claimed is:

1. A method for controlling a throttleless internal combustion engine responsive to a desired engine speed signal, the method comprising the steps of:

generating a driver demanded engine speed value corresponding to an operator input;

generating a speed control system engine speed value corresponding to a predetermined speed value to permit vehicle operation at a constant speed by a speed control system;

arbitrating between said driver demanded engine speed value and said speed control system engine speed value to derive a first desired engine speed value;

limiting said first desired engine speed value by a vehicle speed limit value, engine speed limit value, and transmission speed limit value to generate a second desired engine speed value; and controlling said engine output by modifying at least one of a valve timing value, spark advance value, or fuel flow value as a function of said second desired engine speed value and an actual engine speed value.

2. The method of claim 1 further comprising the steps of:
generating an engine output torque limit value; and
limiting said second desired engine speed value as a function of said engine output torque value.

3. The method of claim 2 wherein the step of generating an engine output torque limit value comprises the steps of:
generating a traction control system torque value corresponding to a maximum engine output torque value to prevent wheel slip;
generating a transmission torque limit value corresponding to a maximum engine output torque capability of a transmission; and
setting said engine output torque limit value to the lesser of said traction control system torque value and said transmission torque limit value.

4. The method of claim 3 wherein the step of generating a driver demanded engine speed value includes the steps of generating a driver demanded engine acceleration value and integrating said driver demanded engine acceleration value.

5. The method of claim 1 further comprising the step of converting said desired vehicle speed limit value to an engine speed domain value representing said vehicle speed limit value.

6. The method of claim 1 wherein the step of generating a speed control system engine speed value includes the step of converting a speed control system vehicle speed value to an engine speed domain value.

7. A throttleless internal combustion engine system comprising:
a plurality of cylinders each of which include a spark plug responsive to a spark advance value and at least one valve variably operable between open and closed positions and responsive to a valve timing signal, each cylinder being in fluid communication with a fuel injector responsive to a fueling rate command;
a driver demand controller for generating a driver demanded engine speed value corresponding to an operator input;
a speed control system for permitting vehicle operation at a constant speed and for generating a corresponding speed control system engine speed value;
an arbitration mechanism for deriving a first desired engine speed value as a function of said driver demanded engine speed value and said speed control system engine speed value;
a controller in operative communication with said spark plug, valve and fuel injector and containing logic for limiting said first desired engine speed value by a vehicle speed limit value, engine speed limit value, and transmission speed limit value to generate a second desired engine speed value and generating said spark advance value, valve timing signal and fueling rate command as a function of said second desired engine speed value and an actual engine speed value.

8. The engine system of claim 7 wherein said engine is a direct injection spark ignition internal combustion engine.

9. The engine system of claim 7 wherein said engine is a gaseous-fueled internal combustion engine.

10. The engine system of claim 7 further comprising:
a traction control system for generating a traction control system torque value corresponding to a maximum engine output torque value to prevent wheel slip; and
a transmission controller for generating a transmission torque limit value corresponding to a maximum engine output torque capability of a transmission; and
wherein said controller includes logic for setting an engine output torque limit value to the lesser of said traction control system torque value and said transmission torque limit value and limiting said second desired engine speed value as a function of said engine output torque value.

11. A computer readable storage medium having stored data representing instructions executable by an engine controller to control a throttleless internal combustion engine having variable valve timing to provide transient engine speed control, the computer readable storage medium comprising:
instructions for generating a driver demanded engine speed value corresponding to an operator input;
instructions for generating a speed control system engine speed value corresponding to a predetermined speed value to permit vehicle operation at a constant speed by a speed control system;
instructions for arbitrating between said driver demanded engine speed value and said speed control system engine speed value to derive a first desired engine speed value;
instructions for limiting said first desired engine speed value by a vehicle speed limit value, engine speed limit value, and transmission speed limit value to generate a second desired engine speed value; and
instructions for controlling said engine output by modifying at least one of a valve timing value, spark advance value, or fuel flow value as a function of said second desired engine speed value and an actual engine speed value.

12. The computer readable storage medium of claim 11 further comprising:
instructions for generating an engine output torque limit value; and
instructions for limiting said second desired engine speed value as a function of said engine output torque value.

13. The computer readable storage medium of claim 12 further comprising:
instructions for generating a traction control system torque value corresponding to a maximum engine output torque value to prevent wheel slip;
instructions for generating a transmission torque limit value corresponding to a maximum engine output torque capability of a transmission; and
instructions for setting said engine output torque limit value to the lesser of said traction control system torque value and said transmission torque limit value.

14. A computer readable storage medium having stored data representing instructions executable by an engine controller to control a throttleless internal combustion engine having variable valve timing to provide transient engine speed control, the computer readable storage medium comprising:

instructions for generating a driver demanded vehicle speed value corresponding to an operator input;

instructions for generating a speed control system value corresponding to a predetermined speed value to permit vehicle operation at a constant speed by a speed control system;

instructions for arbitrating between said driver demanded vehicle speed value, said speed control system value, and a vehicle speed limit value to derive a first desired vehicle speed value;

instructions for converting said first desired vehicle speed value to a first desired engine speed value;

instructions for limiting said first desired engine speed value by an engine speed limit value, and transmission speed limit value to generate a second desired engine speed value; and instructions for controlling said engine output by modifying at least one of a valve timing value, spark advance value, or fuel flow value as a function of said second desired engine speed value and an actual engine speed value.

15. The computer readable storage medium of claim 14 further comprising:

instructions for generating an engine output torque limit value; and instructions for limiting said second desired engine speed value as a function of said engine output torque value.

16. The computer readable storage medium of claim 15 further comprising:

instructions for generating a traction control system torque value corresponding to a maximum engine output torque value to prevent wheel slip;

instructions for generating a transmission torque limit value corresponding to a maximum engine output torque capability of a transmission; and instructions for setting said engine output torque limit value to the lesser of said traction control system torque value and said transmission torque limit value.

* * * * *